(12) United States Patent
Crawford (10) Patent No.: US 8,496,119 B2
(45) Date of Patent: Jul. 30, 2013

(54) TWO PIECE NON-METALLIC RELIEF VALVE

(75) Inventor: Brian Scott Crawford, Bessemer City, NC (US)

(73) Assignee: Purolator Filters NA LLC, Fayetteville, NC (US)

( * ) Notice: Subject to any disclaimer, the term of this patent is extended or adjusted under 35 U.S.C. 154(b) by 553 days.

(21) Appl. No.: 12/165,839

(22) Filed: Jul. 1, 2008

(65) Prior Publication Data

US 2010/0000918 A1    Jan. 7, 2010

(51) Int. Cl.
*B01D 35/147*    (2006.01)
*B01D 35/157*    (2006.01)
*B01D 27/10*    (2006.01)
*B01D 35/02*    (2006.01)

(52) U.S. Cl.
USPC ............ 210/430; 210/130; 210/424; 210/429

(58) Field of Classification Search
USPC ................. 210/130, 117, 118, 136, 533, 302, 210/313, 390, 392, 395, 424, 429, 430, 431
See application file for complete search history.

(56) References Cited

U.S. PATENT DOCUMENTS

| | | | | |
|---|---|---|---|---|
| 2,059,749 A | * | 11/1936 | Rosewood | 4/394 |
| 2,765,105 A | * | 10/1956 | Sullivan | 210/533 |
| 3,785,491 A | * | 1/1974 | Dudinec et al. | 210/130 |
| 4,028,243 A | * | 6/1977 | Offer et al. | 210/130 |
| 4,872,976 A | * | 10/1989 | Cudaback | 210/130 |
| 2005/0040088 A1 | | 2/2005 | Cline | |
| 2005/0218048 A1 | * | 10/2005 | Kato | 210/130 |

* cited by examiner

*Primary Examiner* — Katherine Zalasky
(74) *Attorney, Agent, or Firm* — Crowell & Moring LLP (57) ABSTRACT

A fluid filter is described, which includes a housing having a first end portion defining fluid inlet and fluid outlet areas, a filter media disposed in the housing, having inlet surfaces communicating with the fluid inlet and outlet surfaces communicating with the fluid outlet, and a relief valve assembly for selectively opening a filter bypass connecting the fluid inlet and the fluid outlet. The relief valve assembly has a media plug for anchoring it in the filter media, the media plug having a bypass aperture connecting to the fluid outlet, and a valve element secured to the media plug. The valve element has a valving portion cooperating with the bypass aperture in the media plug for resiliently closing the bypass aperture when an inlet fluid pressure is below a threshold pressure, and for opening the bypass aperture when the inlet fluid pressure is above the threshold pressure.

17 Claims, 6 Drawing Sheets

TWO PIECE NON-METALLIC RELIEF VALVE

BACKGROUND AND SUMMARY OF THE INVENTION

This present invention relates to a filter for use in fluid systems, and more particularly, the invention relates to a relief valve for a filter.

Filters are typically constructed from a housing formed of one or more components secured to one another. A filter media, which is typically a pleated type filter media, is disposed within the interior cavity of the housing. The filter media generally has a hollow cylindrical shape, with an exterior surface defining an input side through which dirty fluid enters. The interior surface of the filter media defines a central fluid passage acting as an outlet that receives the cleaned fluid.

Conventional filters include a center tube acting as a filter media support element, which confers to the assembly a certain amount of structural strength, to retain the shape of the central fluid passage which defines the outlet of the filter. In operation, the fluid filter generally receives dirty fluid, for example motor oil, through an inlet of the housing. The fluid passes through inlet faces of the filter media, which can include the outer circumferential surfaces and one or both end side surfaces, and then passes through the filter media where it is filtered. Finally, the fluid exits through the filter media's outlet surfaces, which generally include the inner surfaces, and follows the central fluid passage to a clean fluid outlet of the filter.

One or more valves are typically provided in the fluid filter to control the flow of liquid through the filter. For example, an anti drain back valve may be provided to prevent the liquid from draining from the inlet side of the filter during periods when the liquid pressure is low, such as when the engine or other system using the lubricating system is off. If the lubricating liquid is allowed to drain from the filter, contaminants may re-enter the lubrication system, and upon starting of the engine, there may not be sufficient lubricant available for the mechanical parts.

A relief valve may also be provided in the filter, which permits the lubricant liquid to bypass the filter media under certain conditions. For example, when the lubricant is cold and highly viscous, or when the filter is clogged, it is important to provide an uninterrupted flow of lubricant, even if it is not filtered. The relief valve is generally designed to open under those circumstances, to let unfiltered lubricant pass through a bypass conduit in the filter and to continue to circulate.

Conventional fluid filters, in particular spin-on type oil filters, utilize relief valves that are formed of multiple complex components, some of which are made of metal and others which may be made of plastic materials. The assembly of these valves within the filter may be difficult, as the parts have to be accurately located, and their alignment has to be assured. This results in an expensive procedure that is likely to produce many defective filters, which have to be rejected. These designs add to the production line size, inventory and manpower, increasing the cost and the variance of constructing the filters.

The exemplary embodiments of the present invention provide a non-metallic relief valve, also referred to as a bypass valve, which only has two parts. These parts are designed to be easy to assemble correctly, to reduce the time and cost associated with manufacturing the fluid filter. The reduced parts count also simplifies the manufacturing support necessary for this filter, for example the manufacturing parts inventory.

In one exemplary embodiment, the relief valve includes two parts made of silicone. The exemplary valve opens to the inner diameter of the filter element, such as the central fluid passage, due to the differential pressure across portions of the valve. For example, the valve may be set to open when a pre-set pressure limit or threshold is exceeded, indicating that the lubricant is unable to pass through the filter media in the normal manner.

The valve element may be secured to the filter media via its peripheral edge. For example, a media plug may be mounted on or in the filter media, and may provide a mounting flange or surface on which is disposed the valve element. The valve element and the media plug cooperate to seal the relief passage during normal operation of the filter, when the pressure of the lubricant is below the pre-set pressure threshold. When the threshold is exceeded, the valve element and the media plug cooperate to open the relief passage, and let the lubricant pass through the filter without being filtered.

In one exemplary embodiment, the media plug may have walls that define apertures which connect the inlet portions of the filter with the outlet portions. Under normal operating conditions, the valve element maintains those apertures closed, so that the only passage from the inlet to the outlet portions is through the filter media. However, a threshold value of the pressure in the lubricant fluid can be defined, above which the valve element opens the apertures, and lets the lubricant fluid bypass the filter media. For example, this threshold value may be selected to correspond to clogging of the filter media.

Other objects, advantages and novel features of the present invention will become apparent from the following detailed description of the invention when considered in conjunction with the accompanying drawings.

DETAILED DESCRIPTION OF THE DRAWINGS

Figure 1:
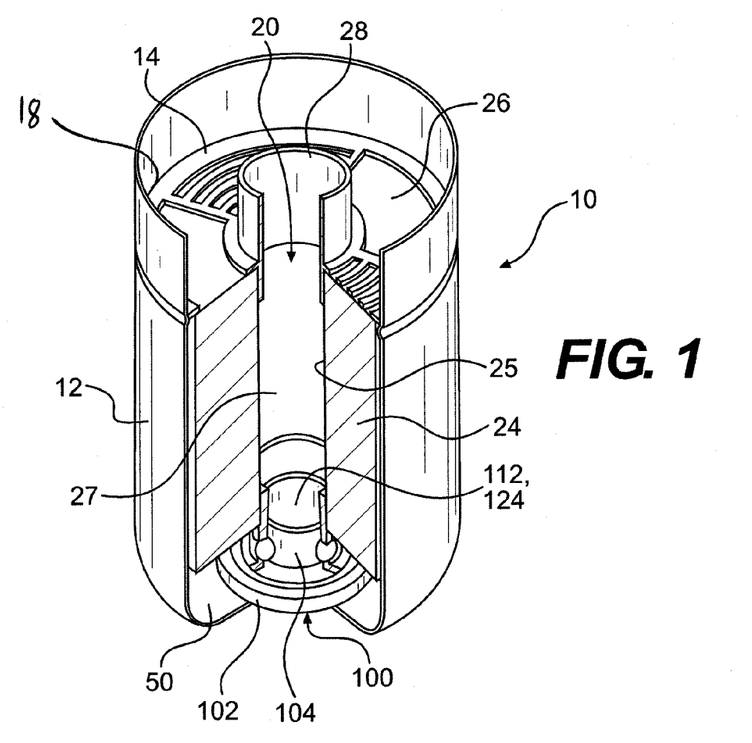
FIG. 1 is a perspective view showing a first embodiment of a media plug valve element according to the present invention.

An exemplary embodiment of the relief valve element according to the invention is shown in FIG. 1. A filter 10 is typically used for filtering fluid such as in a lubrication system for an engine. The filter 10 includes a can or housing 12 that may be constructed from one or more components secured to one another. For example, a nut plate 14 may be secured to an outer cylindrical wall portion with a seam 18. An O-ring may be placed on the nut plate 14 to form a seal between the filter 10 and a mounting adaptor (not shown).

The exemplary filter 10 includes an interior cavity 20 with a filter media 24 disposed within the cavity interior 20 to filter debris from the fluid so that clean fluid may be returned to the engine, such as for lubrication of engine components. The filter media 24 may be of a generally cylindrical shape and is typically pleated to form inner edges 25 that define a central opening 27. The filter media 24 is typically retained between end caps, which are not shown for clarity. The filter media 24 has an inlet side 26 that receives dirty fluid and an outlet side 28 where clean fluid exits the filter media 24. The nut plate 14 may include openings to permit dirty fluid to enter the filter 10. The clean fluid exits the central opening 27 through an aperture of the nut plate 14, and flows into the mounting adaptor.

It should be understood that the fluid flow may be reversed from that described above. Furthermore, the valve according to the present invention may also be used with a cartridge type filter typically located within a suitable fixed housing. The filter media in that case is retained between spaced apart end discs, such that the outer perimeter of the filter media is left exposed. Such a filter media arrangement is well known in the art. Moreover, it is to be understood that the relief valve according to the present invention, as discussed below, may be used in any suitable filter configuration.

Figure 4:
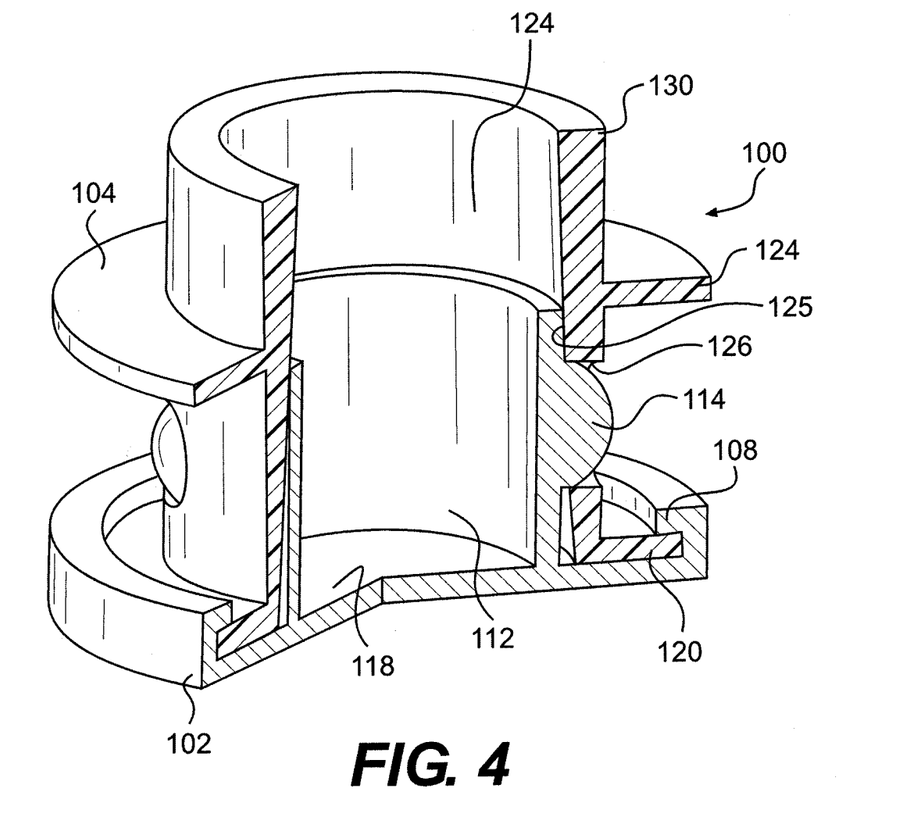
FIG. 4 is a cutaway perspective view showing the assembly of FIG. 3 mounted in an oil filter, according to the invention.

The exemplary filter 10 includes a relief or bypass valve assembly 100 which may be disposed at one end of the filter media 24. For example, the valve assembly 100 may be at an opposite end from the nut plate 14, within the housing 12. However, those of skill in the art will understand that the relief valve assembly 100 may also be located at the other end of the filter media. The exemplary relief valve assembly 100 may be disposed in a bypass chamber 50 of the interior cavity 20, which is in fluid communication with the inlet side 26 of the filter. The inner conduits 112, 124 of the relief valve assembly 100 may be in fluid communication with the central opening 27, and with the outlet side 28.

In the exemplary embodiment, the relief valve assembly 100 is disposed in the bypass chamber 50 formed at an end of the housing 12 opposite to the nut plate 14. In this location, the relief valve assembly 100 may be used to retain the filter media 24 in place within the filter housing 12. Because the relief valve assembly 100 is preferentially made of a resilient or elastic material, it can be anchored in the filter media, and can act as a retainer spring urging the filter media against the nut plate 14.

In normal operation, the relief valve 100 does not provide an open fluid path between the bypass chamber 50 and the central opening 27. However, when the pressure of the lubricant fluid passing through the filter 10 increases beyond a certain level, for example a pre-selected threshold pressure limit, the relief valve assembly 100 is designed to open and permit passage of the lubricant around the filter media 24.

Figure 2:
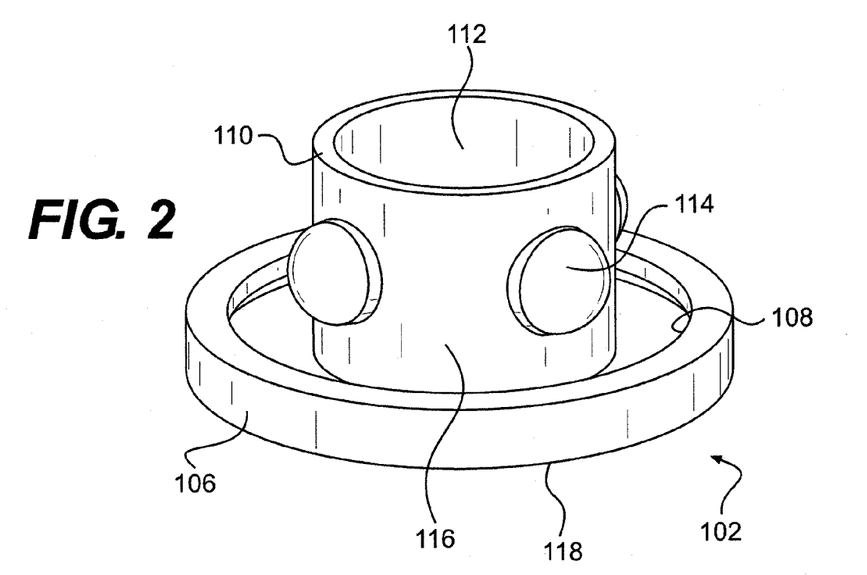
FIG. 2 is a perspective view of a media plug according to an embodiment of the present invention, usable with the valve element of FIG. 1.
Figure 3:
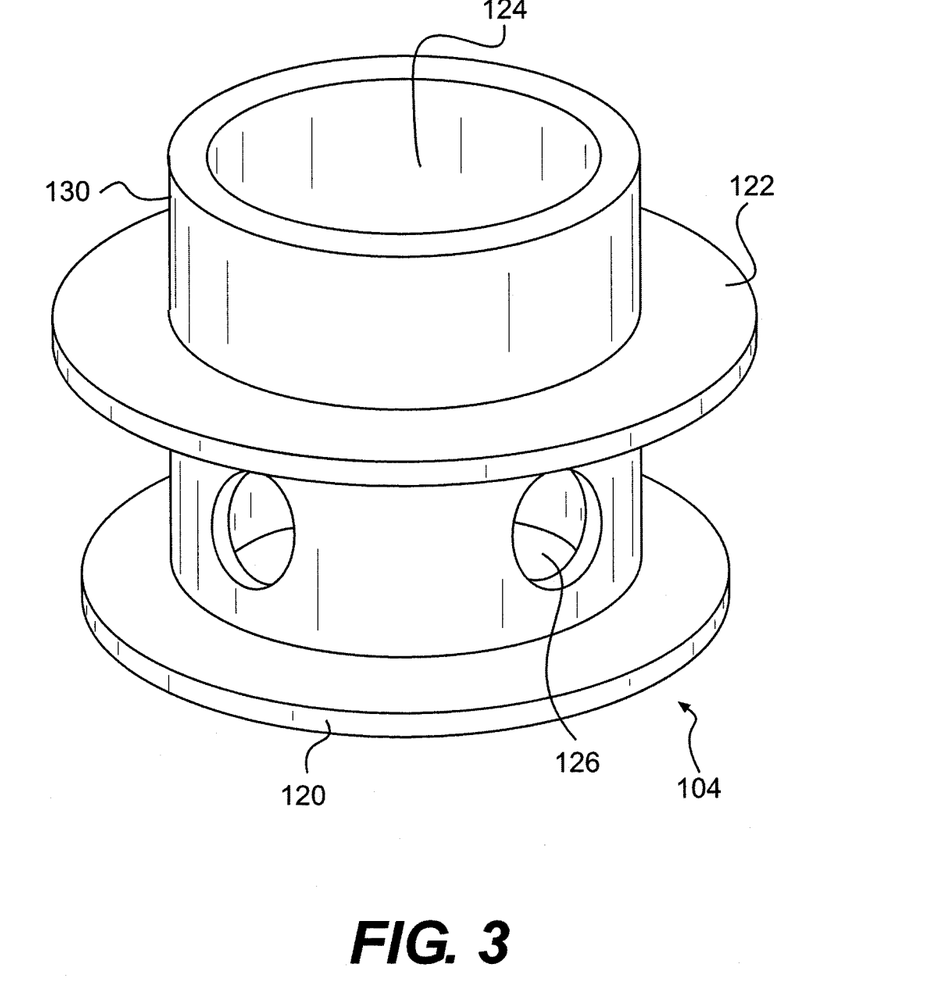
FIG. 3 is a cutaway perspective view of the assembled media plug and valve element shown in FIGS. 1, 2.

In one exemplary embodiment, the relief valve assembly 100 includes a media plug 104 defining an inner conduit 124, into which may be slidably engaged a generally cylindrical resilient portion 110 of a valve element 102. It will be understood by those skilled in the art that the exact configuration of the valve element 102 may be varied, and can include, for example, a cylindrical or conical portion, a cylindrical or conical shell portion, or a truncated conical configuration. The exemplary media plug 104 includes a body 131 defining bypass apertures 126 which, when open, provide a bypass passage through the filter 10 for the liquid.

When the two parts of the relief valve assembly 100 are assembled in the filter 10, the inner conduit 112 of the valve element 102 is in fluid communication with the central opening 27 of the filter 10. The inner conduit 112 is only open towards the outlet portion of the filter, and a partition 118 is provided at the other end to prevent passage of fluid. The dimensions and shape of the inner conduit 112 may be varied, or the inner conduit 12 may be filled in since, as described below, it is not necessary that the liquid be able to flow though it.

An annular element 106 is provided at the periphery of the exemplary valve element 102 to provide an attachment to the media plug 104. For example, the annular element 106 may include a mating surface 108, which engages a flange portion 120 of the media plug 104 to form a mechanical connection. Those of skill in the art will understand that different methods of connecting the media plug 104 and the valve element 102 may be used in addition to the one described above, which maintain the two parts in the desired relative position. Other shapes of the valve element 102, as well as of the media plug 104 may be used according to the invention. For example, an oval, elliptical or other cross sectional shape may be used, depending on the specific application of the valve assembly 100.

The exemplary valve element 102 includes a generally cylindrical resilient portion 110 having an outer shape adapted to fit within the inner conduit 124 of the media plug 104 during normal use. As shown in FIG. 4, the outer surfaces 116 are shaped to form, at least in part, a seal with the inner surfaces 125 of the media plug 104. The protrusions 114, which in this example are generally convex and rounded, are dimensioned to fit in the bypass apertures 126, and to seal them when the two parts are engaged in normal operation of the filter 10. The seal between the surfaces 116 and 125, and between the protrusions 114 and the bypass apertures 126 is maintained by the resilience of the material forming the valve element 102, which urges surfaces of the valve element 102 against opposing surfaces of the media plug 104.

In one exemplary embodiment, the mating surface 108 may have a "C" shaped cross section which engages around the edge of the flange portion 120. However, other attachments of the valve portion 102 to the media plug 104 may be used, such as attachments using fasteners, bonding, and friction attachment. Alternatively, the relief valve assembly 100 may be an unitary element which does not require assembly of two separate parts, or in which the parts are permanently bonded.

In use, the exemplary relief valve assembly 100 is inserted in the filter media 24 as shown in FIG. 1, with an elongated portion 130 of the media plug 104 being disposed in the central opening 27 thereof. In this manner, the media plug 104 provides an anchor in the filter media 24 for the relief valve assembly 100. A flange 122 may be used to limit the extent to which the media plug 104 can be inserted, and optionally to apply a force urging the filter media 24 towards the nut plate 14 of filter 10.

When the fluid, such as a lubricating liquid, in the filter 10 has a pressure within the normal operating pressure range for the system, the surfaces 116 and the protrusions 114 form a seal with the media plug 104 and the bypass apertures 126. Fluid thus cannot flow from the relief cavity 50 to the central opening 27 unless it passes through filter media 24.

If the fluid pressure in the filter, and more specifically on the inlet side of the filter increases above a pre-selected threshold value, the resilient portion 110 is designed to deform. This permits the protrusions 114 to be displaced from the bypass apertures 126, so that fluid can flow between surfaces 116 and 125, from the relief cavity 50 to the central opening 27, while bypassing the filter media 24. This arrangement allows the fluid to flow in the system even if the filter media becomes clogged from contaminants, or if the viscosity of the fluid is so high that it cannot pass through the filter media.

In one exemplary embodiment, the threshold pressure at which the relief valve assembly 100 opens may be set approximately to a value corresponding to the fluid pressure that occurs when the filter media 24 becomes clogged. For example, the thickness, shape and dimensions, as well as the material of the various resilient portions forming the valve element 102 may be selected to result in the desired opening pressure threshold.

Figure 5:
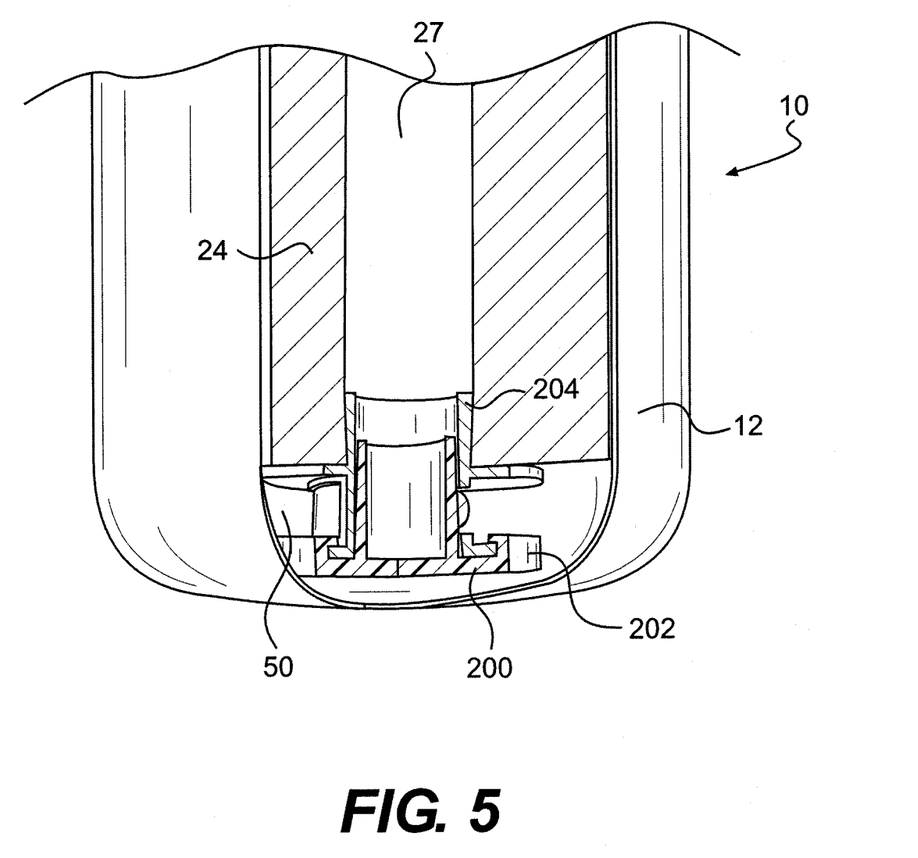
FIG. 5 is a perspective view showing a second embodiment of a media plug valve element according to the present invention.

A different embodiment of the relief valve assembly according to the invention is shown in FIG. 5. in this example, a filter 10 having a housing 12 similar to the one described above is fitted with a relief valve assembly 200. As discussed above, the relief valve 200 may be disposed in a bottom portion of the filter housing 12, opposite from the inlet/outlet portions of the filter 10.

Figure 6:
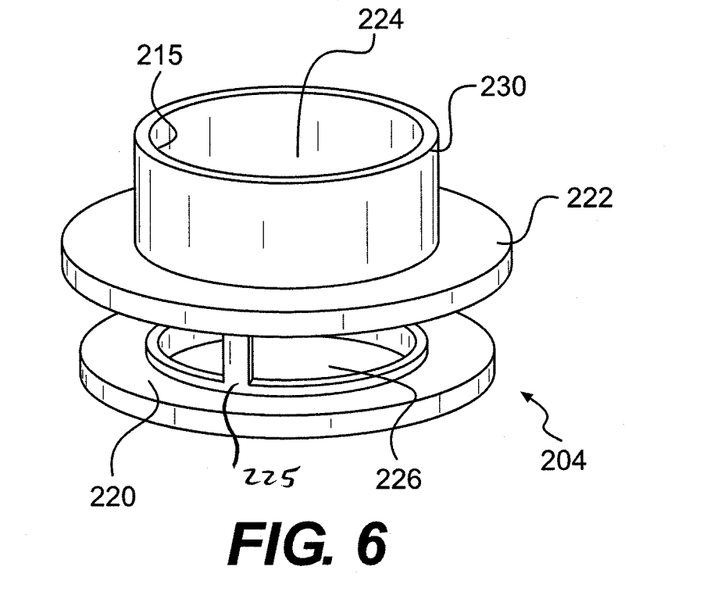
FIG. 6 is a perspective view of a media plug according to another embodiment of the present invention, usable with the valve element of FIG. 5.
Figure 7:
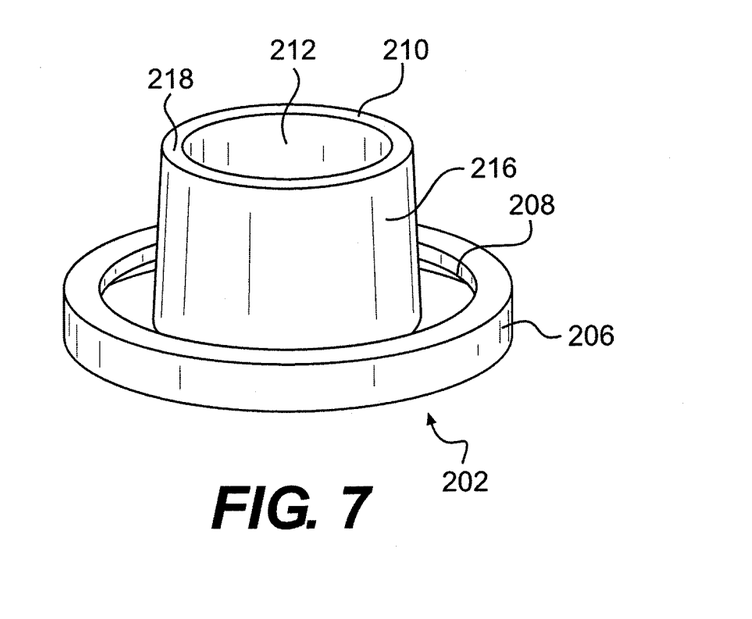
FIG. 7 is a cutaway perspective view of the assembled media plug and valve element shown in FIGS. 5, 6.
Figure 8:
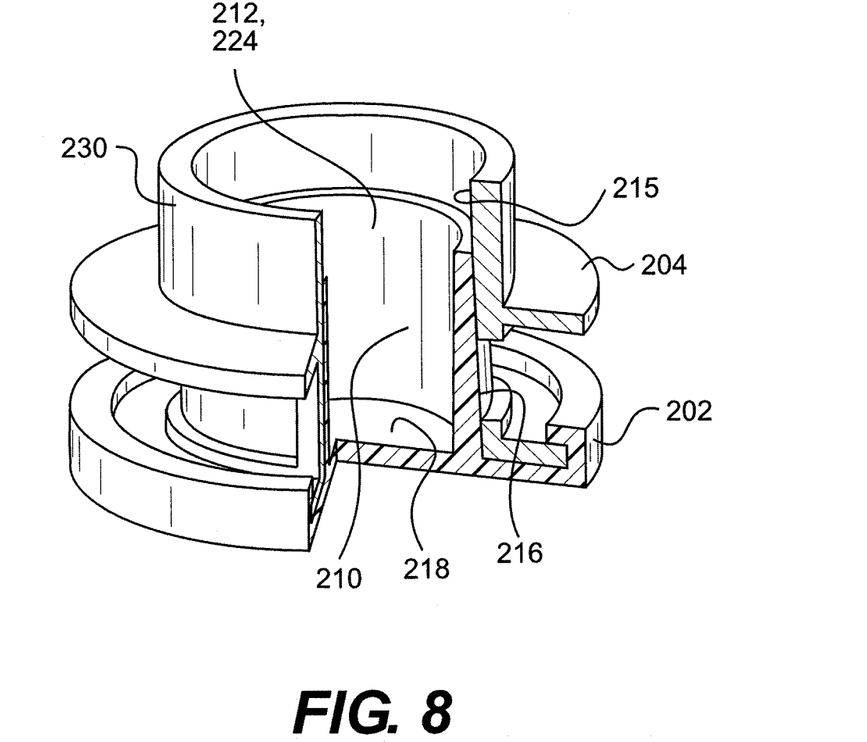
FIG. 8 is a cutaway perspective view showing the assembly of FIG. 7 mounted in an oil filter, according to the invention.

As shown in FIGS. 6-8, the exemplary relief valve assembly 200 is formed of a media plug 204 having an inner conduit 224 into which fits a valve element 202. The media plug 204 may be attached to the filter media 24 via an elongated element 230, and may include a flange 222 to limit insertion into the center passage 27. A mating flange 220 may be provided to attach the valve element 202 to the media plug 204, as discussed above. Bypass apertures 226 are provided on the body of the media plug 204, to provide, when open, a fluid passage from the relief cavity 50 to the central passage 27. In the exemplary embodiment, the bypass apertures 226 include circumferential slots formed in the body 225 of the media plug 204.

During normal operation, the valve element 202 is disposed within the media plug 204, so that the valving surface 216 is resiliently urged against the inner surfaces 216 of the media plug 204, and seals the bypass apertures 226. For example, the resilient element 218 may provide the force to maintain the valve sealed. An annular element 206 having a mating surface 208 engages the flange 220 of the media plug 204 to secure the two components together.

In a manner analogous to the operation of the relief valve described above, the relief valve assembly 200 does not allow fluid to bypass the filter media 24 when the fluid pressure is below a predetermined threshold value. When this pressure increases beyond the threshold, the resilient element 218 is deformed by the force of the fluid, and the valving surface 216 is displaced from its sealing position against the media plug 204, so that the fluid is free to pass from the relief cavity 50 to the filter outlet via the bypass apertures 226, and between the surfaces 215, 216.

In the exemplary embodiment described above, the resilient element 218 is shaped as a truncated conical shell. Those of skill in the art will understand that different configurations of the resilient element and of the valving surface can be implemented. For example, both solid and shell-like cylindrical or conical elements may be used. The materials forming the valve element 202 may be resilient. Alternatively, the materials may be flexible, and a different resilient material or a mechanism for providing a force urging the valving surface 216 into the desired shape, may be disposed in the inner conduit 212, or in another location where it acts on the valving surface 216.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fluid filter, comprising:
   a housing having a first end portion defining fluid inlet and fluid outlet areas;
   filter media disposed in the housing, having inlet surfaces communicating with the fluid inlet and outlet surfaces communicating with the fluid outlet;
   a relief valve assembly for selectively opening a filter bypass connecting the fluid inlet and the fluid outlet;
   a media plug of the relief valve assembly for anchoring in the filter media, the media plug having a bypass aperture connecting to the fluid outlet; and
   a valve element connected to the media plug, having a valving portion cooperating with the bypass aperture in the media plug for resiliently closing the bypass aperture when an inlet fluid pressure is below a threshold pressure, and for opening the bypass aperture when the inlet fluid pressure is above the threshold pressure,
   wherein the valving portion comprises a support for resiliently urging the valving surface against the media plug to close the bypass aperture, the support being deformable to open the bypass aperture when the inlet fluid pressure is above the threshold pressure, and
   wherein the valving surface comprises protrusions extending from the annular shell into corresponding bypass apertures.

2. The fluid filter according to claim 1, further comprising an anchoring portion of the media plug, adapted for fitting in a central opening of the filter media.

3. The fluid filter according to claim 1, wherein a mating surface of said valve element engages a flange portion of said media plug.

4. The fluid filter according to claim 1, wherein the protrusions comprise convex rounded surfaces forming a seal with peripheral surfaces of corresponding rounded bypass apertures.

5. The fluid filter according to claim 1, wherein the valving surface comprises a truncated conical portion extending into a corresponding inner portion of the media plug.

6. The fluid filter according to claim 1, wherein the support comprises a substantially annular resilient shell.

7. The fluid filter according to claim 1, wherein the relief valve assembly is disposed in the housing opposite the first end portion.

8. The fluid filter according to claim 7, wherein the relief valve assembly is disposed in a bypass chamber of the housing to selectively block fluid connection between the bypass chamber and the fluid outlet of the filter.

9. The fluid filter according to claim 1, wherein the relief valve assembly is formed of one of rubber, silicone and a resilient polymer.

10. The fluid filter according to claim 1, wherein the relief valve assembly is disposed between the filter media and an inner surface of the housing, to retain the filter media in a desired position therein.

11. A relief valve assembly for a liquid filter, comprising:
    a media plug for anchoring the relief valve assembly in a filter media of the liquid filter;
    a body of the media plug defining at least one bypass aperture to provide fluid communication between an inlet and an outlet of the liquid filter while bypassing the filter media;

a valve element connected to the media plug, having a valving portion cooperating with the at least one bypass aperture in the media plug for selectively closing the at least one bypass aperture; and a resilient support portion of the valve element for urging the valving portion against corresponding surfaces of the media plug to close the at least one bypass aperture when an inlet fluid pressure is below a threshold pressure, wherein the valving portion comprises at least one protrusion extending into said at least one bypass aperture.

12. The relief valve assembly according to claim 11, wherein the resilient support portion of the valve element is adapted to open the bypass aperture when the inlet fluid pressure is above the threshold pressure.

13. The relief valve assembly according to claim 12, wherein the resilient support portion of the valve element is deformable by the fluid when the inlet fluid pressure is above the threshold pressure.

14. The relief valve assembly according to claim 11, wherein said at least one protrusion is substantially rounded and at least one bypass aperture is substantially rounded.

15. The relief valve assembly according to claim 11, wherein the at least one bypass aperture comprises a circumferential slot formed in a body of the media plug.

16. The relief valve assembly according to claim 15, wherein the valving portion comprises one of a cylindrical and a truncated conical portion having outer surfaces selectively sealing the circumferential slot.

17. The relief valve assembly according to claim 11, wherein the media plug has surfaces for urging the filter media against an inner surface of the fluid filter.

\* \* \* \* \*